US006422202B1

(12) United States Patent
Wild

(10) Patent No.: US 6,422,202 B1
(45) Date of Patent: Jul. 23, 2002

(54) METHOD AND DEVICE FOR CONTROLLING A GAS FLOW OVER A THROTTLE VALVE IN AN INTERNAL COMBUSTION ENGINE

(75) Inventor: Ernst Wild, Oberriexingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/508,917

(22) PCT Filed: Jul. 11, 1998

(86) PCT No.: PCT/DE98/01937

§ 371 (c)(1), (2), (4) Date: Aug. 11, 2000

(87) PCT Pub. No.: WO99/14475

PCT Pub. Date: Mar. 25, 1999

(30) Foreign Application Priority Data

Sep. 17, 1997 (DE) .......................................... 197 40 918

(51) Int. Cl.[7] .......................... F02D 11/10; G01M 19/00
(52) U.S. Cl. ......................... 123/399; 701/115; 73/118.2
(58) Field of Search .................................. 123/361, 396, 123/399, 403, 478, 585, 586; 701/103, 115; 73/117.3, 118.2

(56) References Cited

U.S. PATENT DOCUMENTS 4,418,673 A * 12/1983 Tominari el al. ........... 123/399
4,473,052 A * 9/1984 Kamiyama et al. ......... 123/399
5,526,787 A * 6/1996 Pallett ......................... 123/399
5,606,951 A 3/1997 Melbourne et al. .......... 123/399

FOREIGN PATENT DOCUMENTS

| | | |
|---|---|---|
| DE | 195 08 641 | 7/1996 |
| EP | 0 339 638 | 11/1989 |
| EP | 0 735 256 | 10/1996 |

* cited by examiner

*Primary Examiner*—Willis R. Wolfe
(74) *Attorney, Agent, or Firm*—Kenyon & Kenyon

(57) ABSTRACT

A method and a device for controlling a gas flow over a throttle valve in an internal combustion engine. The method and device can be used in particular in internal combustion engines in motor vehicles and allow for fast and accurate control of a gas flow while minimizing apparatus and control costs. A method is provided for controlling a gas flow over a throttle valve in a combustion over the throttle valve and the actual gas flow; and taking into account the determined difference when calculating the throttle setting.

13 Claims, 4 Drawing Sheets

METHOD AND DEVICE FOR CONTROLLING A GAS FLOW OVER A THROTTLE VALVE IN AN INTERNAL COMBUSTION ENGINE

FIELD OF THE INVENTION

The present invention relates to a method and a device for controlling a gas flow over a throttle valve in an internal combustion engine. The present invention concerns, in particular, a method and a device for use in automotive engineering.

BACKGROUND INFORMATION

An air/fuel mixture is ignited in the combustion chamber of an internal combustion engine to generate an engine torque. The gas mass filling the combustion chamber must be controlled and detected as accurately as possible because it determines, among other things, the engine torque, the fuel volume to be injected, and the ignition point.

Using an "electronic gas pedal" in modern engine control systems, the pedal position is interpreted as a torque request. This torque request is converted to a setpoint for the air mass flow. A "charge control" function calculates a setpoint air mass flow from the torque request and generates from this value a setpoint for controlling the throttle plate. A control element adjusts the throttle plate to the setpoint. A downstream hot-film air mass sensor measures the actual air mass flow. Based on tolerances in the hot-film air mass sensor and in the calculation path of the calculation of air mass flow over the throttle valve, a difference is produced between the actual value and the setpoint of the air mass flow and between the actual torque and the torque request.

To correct these inaccuracies, an adjustment system that has not only one adjustment unit, but two adjustment units, is described in European Patent No. 575710. In a convention device, the first adjustment unit sends the actuating signal to the adjustment path, while the second adjusting unit is used to calibrate the first adjusting unit. In the known device, a throttle-plate-based charge signal is used to control injection, with this relatively fast adjusting signal being calibrated by an air mass meter in the stationary state.

SUMMARY OF THE INVENTION

The object of the present invention is to provide a method and a device for controlling a gas flow over a throttle valve in an internal combustion engine, thereby adjusting the gas flow quickly and precisely. In addition, it must be possible to carry out the method as well as produce and operate the device economically.

The object is achieved, in particular, by providing a method for controlling a gas flow over a throttle valve in a combustion chamber of an internal combustion engine having the following steps: calculation of a throttle setpoint setting from the setpoint gas flow, activation of the throttle valve using the throttle setpoint setting, and determination of an actual gas flow, characterized by the following steps: calculation of a gas flow over the throttle valve on the basis of an actual throttle setting, determination of a difference between the calculated gas flow over the throttle valve and the actual gas flow, and taking into account the determined difference when calculating the throttle setpoint setting, in particular by adjusting the setpoint gas flow. In doing this, the setpoint air mass in the combustion chamber is advantageously converted in one step to a throttle valve setpoint at which an actual air mass begins to form with the accuracy of the sensor used to determine the actual gas flow. A hot-film air mass sensor can be used, in particular, as the sensor for determining the actual gas flow. A further advantage lies in the fact that, unlike the related art, an additional charge controller, which subsequently adjusts the setpoint and actual mass, is not used. This reduces the production, maintenance, and operating costs. A further advantage lies in the fact that the single-step control stabilizes the throttle plate characteristic, thereby improving the operation of the entire internal combustion engine unit. A further advantage lies in the fact that the method makes it possible to adjust the desired air mass flow very quickly and precisely. In the steady state, in particular, there is no difference between the setpoint charge and the actual charge measured by the hot-film air mass sensor.

In one particular embodiment of the present invention, the method is characterized by a determination of at least two correction quantities when taking into account the difference between the gas flow over the throttle plate of the throttle valve and the actual gas flow. This has the advantage that the determination of at least two correction quantities makes it possible to achieve faster and more precise control. An additional advantage lies in the fact that the determination of at least two correction quantities provides for the separate treatment of and compensation for different error quantities and disturbances, thus further improving control accuracy and speed.

In a further embodiment of the present invention, the method is characterized by additively taking into account at least one first correction quantity and multiplicatively taking into account at least one second correction quantity, with the first and second correction quantities being taken into account simultaneously or alternately, in particular the first correction quantity being taken into account, i.e., being relevant, primarily in the case of small gas flows and the second correction quantity being taken into account, i.e., being relevant, primarily in the case of large gas flows over the throttle valve. In a further embodiment of this design, the first correction quantity corrects an error caused by leakage air over the throttle valve, and the second correction quantity corrects an error caused by an incorrect detection of a pressure upstream from the throttle valve. This is advantageous because it allows the two errors to be handled according to their specific error characteristics, thus increasing control accuracy. One advantage lies in the fact that an error caused by leakage air, which is made noticeable by an additive error in any operating state, but is not relevant especially with small gas flows, can be treated accordingly. Likewise, an error caused by erroneous pressure detection, which is noticeable in any operating state and is relevant, in particular, with large gas flows, can also be treated accordingly. The two correction quantities can be preferably taken into account simultaneously, thus achieving a high control accuracy. Overall, an embodiment of this type provides very fast and yet highly accurate and reliable control, at the same time lowering costs of both equipment and computer-supported control.

In a further embodiment of the present invention, at least one of the correction quantities is stored at the end of operation of the internal combustion engine. This advantageously provides full control accuracy as soon as the internal combustion engine resumes operation. The correction quantities can be advantageously stored by appropriate electronic components, for example by an SRAM component or a magnetic storage device.

In a further embodiment of the present invention, a predetermined value is used as a starting value for at least one of the correction values when operation of the internal combustion engine resumes. This is advantageous because it allows a selected cold-start value to be easily determined for specific correction quantities. The provision of predetermined values is also advantageous because it maintains secure control even if the internal combustion engine is idle for an extended period of time or if data or information relating to the predetermined correction quantities is lost.

In a further embodiment of the present invention, the setpoint gas flow is determined on the basis of at least one request for the torque of the internal combustion engine. This is advantageous because, in a motor vehicle with an internal combustion engine, not only can the torque request via the gas pedal be taken into account, but also torque requests that are produced by an automatic transmission of the motor vehicle or by an anti-spin control system of the motor vehicle.

The object of the present invention is also achieved by providing a device for controlling a gas flow over a throttle valve in a combustion chamber of an internal combustion engine including a throttle valve controller having an input signal for a setpoint gas flow and an output signal for a valve position, and a measuring sensor for determining an actual gas flow, characterized in that the throttle valve controller has a computing device which calculate a gas flow over the throttle valve on the basis of the throttle setting, and which further determines a difference between the calculated gas flow over the throttle valve and the actual gas flow, with this difference being taken into account when calculating the output signal, in particular by adjusting the setpoint gas flow. A device of this type according to the present invention has the same advantages mentioned above in connection with the method according to the present invention. In particular, a device of this type is advantageous because it ensures fast and precise control, at the same time reducing the apparatus and computing requirements so that a device of this type can be produced, maintained, and operated economically.

In one embodiment of the present invention, at least two correction quantities are determined when determining the difference. This has the advantage that even complex error quantities and disturbances can be detected quickly and with relatively little effort, achieving stable and precise control. This is particularly true when the at least two correction quantities separately detect error sources with additive and multiplicative error characteristics and preferably take them into account simultaneously.

The subject matter of the present invention also includes a device that carries out one of the above-mentioned control methods according to the present invention. This combines the advantages of fast and accurate control with an economical implementation by a device according to the present invention.

The subject matter of the present invention also concerns a motor vehicle that has a device like the one described above.

The present invention also relates to data media which contain a control program for carrying out one of the above-mentioned control methods according to the present invention, or which contain the parameters that are necessary or advantageous for carrying out one of the above-mentioned methods according to the present invention. The data media can store the information in any form, in particular in mechanical, magnetic, optical or electronic form. In particular, electronic data media are advantageous, for example a ROM, PROM, EPROM or EEPROM device that can be advantageously inserted into corresponding control units. Data media of this type can be used to easily exchange control parameters and control programs, thus making it possible, for example, to configure a standard control unit for different vehicle types simply by inserting the corresponding data medium.

DETAILED DESCRIPTION

Figure 1:
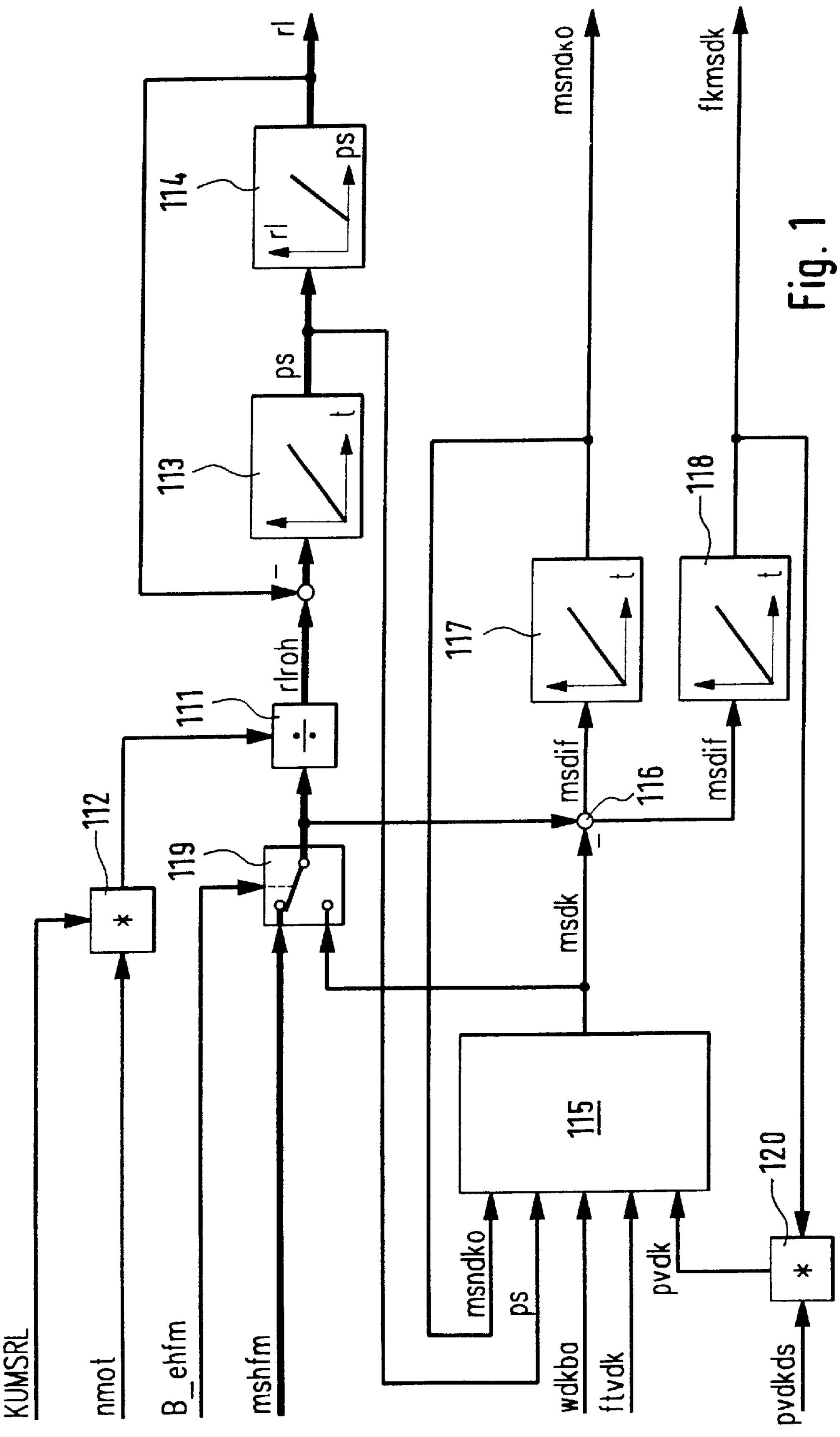
FIG. 1 shows a block diagram for detecting a charge using a hot-film air mass sensor, and for determining two correction quantities.
Figure 2:
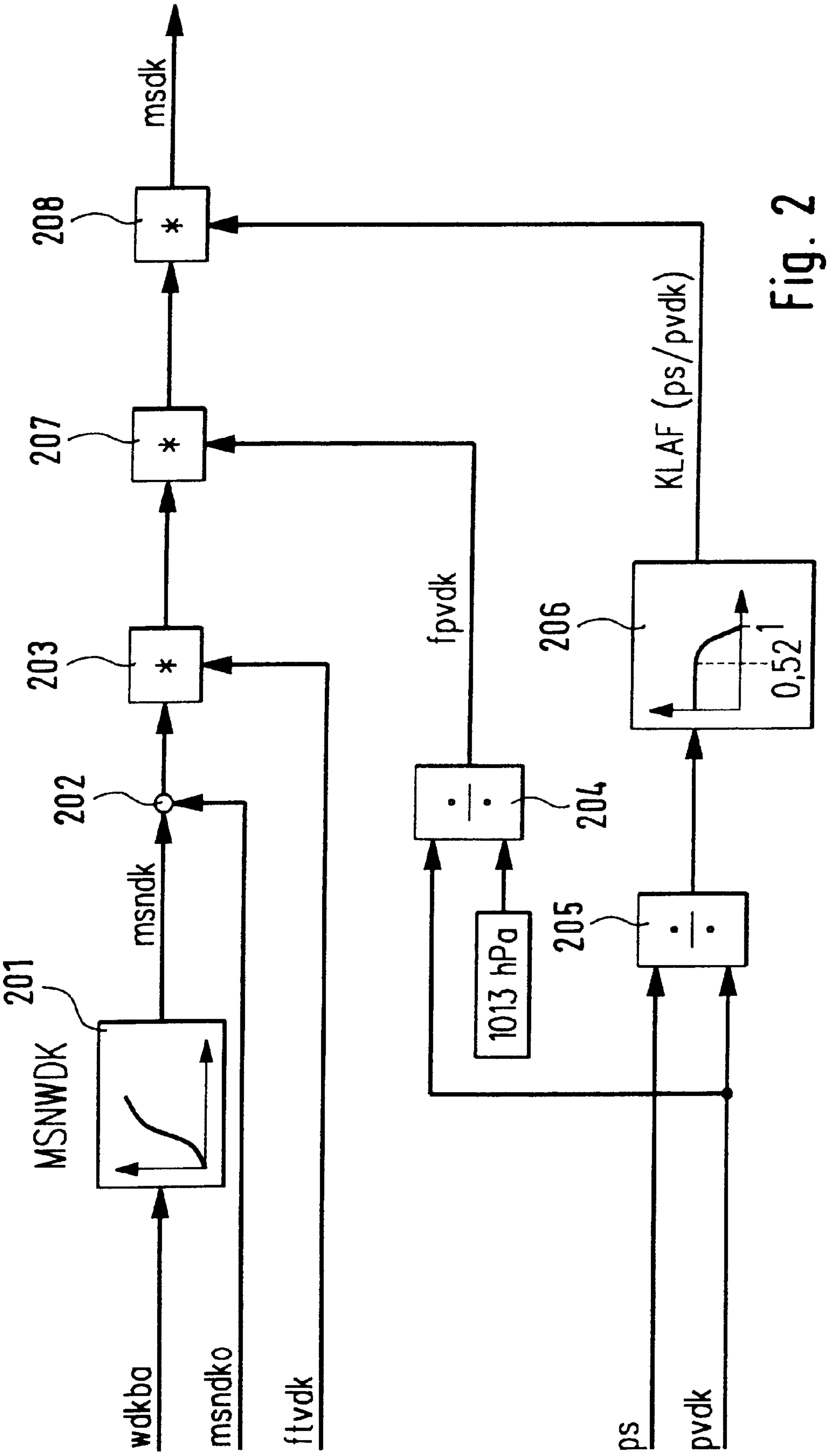
FIG. 2 shows a block diagram for determining a gas flow over a throttle valve.

FIG. 1 shows a block diagram for the charge detection system, including a hot-film air mass sensor, and for determining two correction quantities msndko and fkmsdk. In the upper signal path of FIG. 1, an air mass flow mshfm measured by the hot-film air mass sensor is converted to a corrected relative charge r1 of a cylinder. To do this, air mass flow mshfm measured by the hot-film air mass sensor is first converted to an uncorrected relative charge rlroh of a cylinder. This is done through division 111 of air mass flow mshfm measured by the hot-film air mass sensor by a value that is derived from multiplication 112 of an engine-specific constant KUMSRL by engine speed nmot. Intake manifold pressure ps is derived from uncorrected relative charge rlroh by applying the gas equation and a corresponding integration 113. Corrected relative charge r1 of the cylinder is calculated from intake manifold pressure ps by the taking into account 114 of additional influencing quantities in relation to the flow rate ratios in the intake manifold. To convert the standard air mass flow to a mass flow at an instantaneous temperature, the air mass flowing over the throttle valve is calculated 115 from intake manifold pressure ps together with throttle plate angle wdkba of the throttle valve in relation to a stop and an intake-air temperature-compensation factor ftvdk. FIG. 2 shows a detailed illustration of the calculation of the air mass flowing over throttle valve msdk. Difference msdif is formed by a subtraction 116 from measured air mass flow mshfm and calculated air mass flow msdk. A first additive correction quantity msndko is derived by an integration 117 of difference value msdif. A second multiplicative correction quantity fkmsdk is calculated in the same manner by an integration 118 of difference value msdif. Integration operations 117, 118 also differ from each other, in particular, in terms of the integration constants, i.e., the resulting physical unit. Additive correction quantity msndko is returned directly to the calculation of throttle-valve gas flow 115. Multiplicative correction quantity fkmsdk is also returned to the calculation of the throttle-valve gas flow by a multiplication 120 by an ambient pressure pvdkds measured by a pressure sensor, determining an effective pressure upstream from throttle valve pvdk. By taking into account correction factors msndko and fkmsdk when calculating the gas flow over the throttle valve, the calculated value for the gas flow over throttle valve msdk is brought into alignment with measured value mshfm. This improves the accuracy of this system in such a way that the calculation of relative charge r1 can be based exclusively on calculated gas mass flow msdk if necessary, for example if the hot-film air mass sensor fails. This is done by flipping switch 119 according to a corresponding changeover signal B__ehfm.

In carrying out the multiplicative correction, for example, it is assumed that pressure value pvdk coming from the ambient pressure sensor lies within certain tolerances, producing a difference between calculated gas mass flow msdk and measured gas flow mshfm. The correction responds to this difference by adjusting multiplicative correction quantity fkmsdk until msdk is equal to mshfm. Following a steady-state adjustment, quantity pvdk is identical to the actual pressure upstream from the throttle plate, if the other influencing quantities do not lie within the tolerances. Normally, the adaptation quantities cover all tolerances that occur in the hot-film air mass sensor path and the throttle valve path, causing quantity pvdk to differ from the actual pressure upstream from the throttle valve. Nevertheless, the adjustment serves its purpose, which is to adjust the throttle-valve-based air mass flow calculation to the air mass flow calculation based on the hot-film air mass sensor.

In an induction engine, quantity pvdkds can be derived from an ambient pressure sensor and, in a pressure-charged engine, it can be derived from a charge-air pressure sensor upstream from the throttle valve. In an induction engine with a hot-film air mass sensor and a pressure sensor in the intake manifold, pressure pvdkds can be derived from the intake manifold pressure via a level adaptation. If a pressure sensor is not provided, value pvdkds is set to 1 and fkmsdk is set to the same value as pvdk, while in an induction engine, fkmsdk includes the ambient pressure information along with tolerance inaccuracies in the throttle valve and the hot-film air mass sensor system.

FIG. 2 shows a block diagram for determining gas mass flow msdk over the throttle valve according to calculation unit 115 in FIG. 1. Setpoint angle wdkba of a throttle plate of the throttle valve is first available as the input signal. Setpoint angle wdkba is preferably related to the throttle plate stop. Using a transfer function MSNWDK 201 established in an air test bay, mass flow msndk is calculated downstream from the throttle valve. Additive correction quantity msndko, which preferably detects the leakage air over the throttle valve under normal conditions, is added 202 to mass flow msndk. The value resulting from this addition 202 is multiplied 203 by an intake-air temperature-compensation factor ftvdk for converting the standard air mass flow to an air mass flow at an instantaneous temperature. At the same time, a correction factor fpvdk is derived from a pressure value pvdk upstream from the throttle plate of the throttle valve by division 204 by nominal pressure value 1013 hPa to adjust the air mass flow at normal pressure upstream from the throttle valve to instantaneous conditions. Value pvdk is multiplicatively composed of an ambient pressure pvdkds measured by a pressure sensor and multiplicative correction factor fkmsdk, as shown in FIG. 1. At the same time, a correction factor KLAF (ps/pvdk) is also derived, by quotient formation 205, from intake manifold pressure ps and the pressure upstream from the throttle plate of throttle valve pvdk and a subsequent transfer function 206, which is also known as the outflow characteristic and which adjusts the standard flow through the throttle valve measured at an above-critical flow rate to below-critical flow rates. The two derived correction factors fpvdk and KLAF (ps/pvdk) are each taken into account along with the mass flow by a multiplication 207, 208. To summarize, air mass flow msdk is calculated as follows:

$$msdk = msndk \times ftvdk \times fpvdk \times KLAF\ (ps/pvdk).$$

Figure 3:
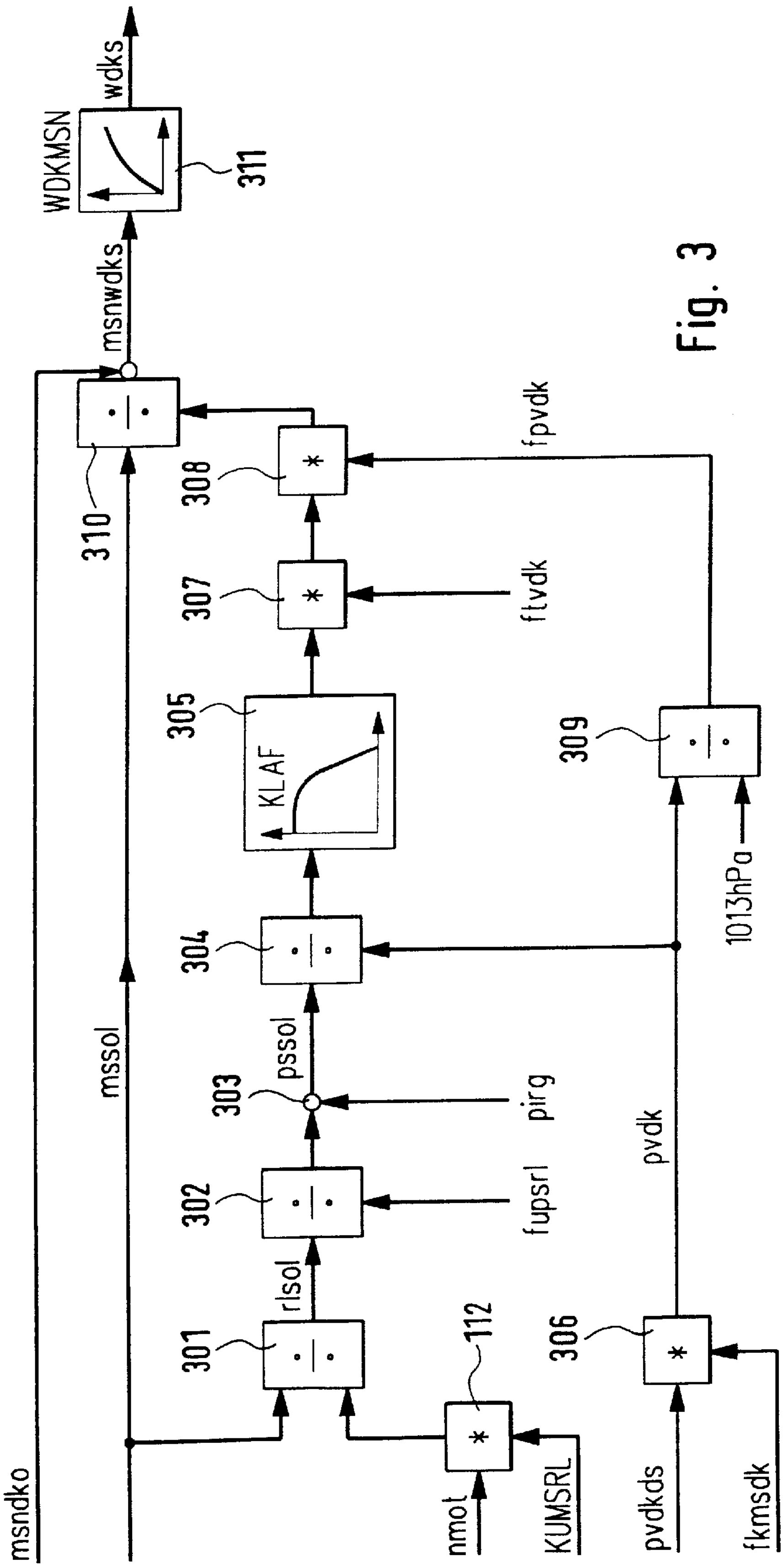
FIG. 3 shows a block diagram for controlling the charge according to the present invention as well as for calculating the throttle valve angle.
Figure 4:
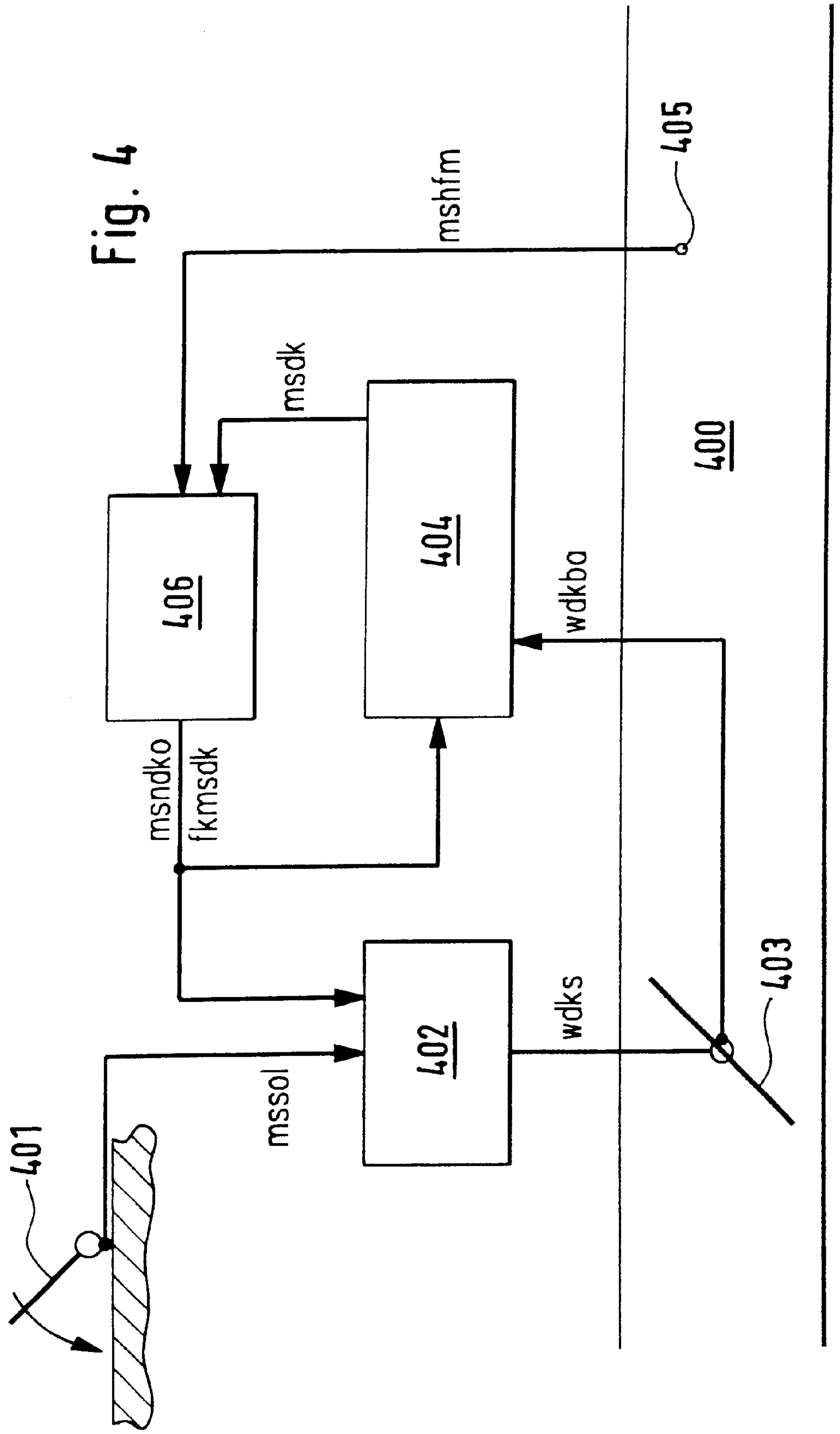
FIG. 4 shows a device according to the present invention for controlling a gas flow over a throttle valve.

FIG. 3 shows the charge control system according to the present invention by calculating the setpoint angle of the throttle plate of throttle valve wdks from the setpoint for air mass flow mssol. In this case, the setpoint for air mass flow mssol is first altered according to different correction quantities. Many of the components of the charge control system according to the present invention are constructed in an inverse relationship to the charge detection system illustrated in FIG. 1. In particular, correction quantities msndko and fkmsdk determined during the course of charge detection are used in the charge control system according to the present invention. As shown in FIG. 1, the parameters of engine speed nmot and KUMSRL are first multiplied 112. Setpoint mssol is divided by the resulting product, yielding a setpoint charge rlsol in the combustion chamber. Further division 302 of this value by a conversion factor fupsrl, "intake manifold pressure in relative charge" and a subsequent addition 303 to a correction factor pirg, which takes into account the partial pressure of the internal exhaust gas recirculation, yields setpoint pressure pssol in the intake manifold. This value pssol is altered by a division 304 by a pressure pvdk upstream from the throttle plate of the throttle valve and transferred to a transfer function 305, which is also known as the "outflow characteristic" and adjusts the standard flow through the throttle valve measured at an above-critical flow rate to below-critical flow rates. Value pvdk is calculated by multiplication 306 from ambient pressure pvdkds measured by a pressure sensor and multiplicative correction factor fkmsdk, just like the calculation shown in FIG. 1. The value derived from outflow characteristic 305 is subsequently adjusted by a multiplication 307 by an intake-air temperature-compensation factor ftvdk to convert the standard air mass flow to an air mass flow at an instantaneous temperature, and subsequently by a multiplication 308 by a correction factor fpvdk to adjust the air mass flow at normal pressure upstream from the throttle valve to instantaneous conditions for the instantaneous temperature and pressure ratios. Correction factor fpvdk is derived from pressure pvdk upstream from the throttle plate of the throttle valve by division 309 by a nominal pressure of 1013 hPa. The value resulting from the calculations described above is subjected to a division 310 together with setpoint mssol for the air mass flow. Additive correction value msndko, which takes into account the leakage air over the throttle valve under normal conditions, is subsequently subtracted from the value reached by division 310. Resulting value msnwdks is transferred to a transfer function WDKMSN 311, which yields the inverted characteristic of transfer function MSNWDK shown in FIG. 2 and thus a setpoint angle wdks for the throttle plate of the throttle valve derived from the corrected and adjusted setpoint for air mass flow msnwdks. FIG. 4 shows the device according to the present invention for controlling a gas flow over a throttle valve. Setpoint mssol for the air mass flow is determined from the position of a gas pedal 401. As shown in FIG. 3, charge control system 402 derives a setpoint angle wdks of a throttle plate 403 from this value. Actual angle wdkba of the throttle plate is detected and serves as an input quantity for charge detection system 404. As shown in FIG. 1, charge detection system 404 derives mass flow msdk over the throttle valve from value wdkba. A hot-film air mass sensor 405 connected downstream in intake manifold 400 determines air mass flow mshfm. As shown in FIG. 1, an additive correction value msndko and a multiplicative correction value fkmsdk are derived from values msdk and mshfm in a comparator and integrator module 405. The two correction values are output to both charge control system 402 and charge detection system 404, where they serve as input quantities. The advantage of this device according to the present invention is not only that charge control system 402 can set a throttle plate angle at which the setpoint matches the value measured by the hot-film air mass sensor without any subsequent correction by a relatively slow controller, but also that, in an injection system located upstream from the intake valve in which the air mass flow at the time the intake valve closes should be known, the throttle plate angle achieved at this later point in time is easier to estimate than a future air mass flow based on the hot-film air mass sensor signal. The future air mass flow can be calculated on the basis of this future throttle plate angle, and thus the instantaneous injection time advantageously corrected, with the correction factors making this prediction just as accurate as the hot-film air mass sensor.

Abbreviations

| | |
|---|---|
| B_ehfm | Error signal, changeover signal. |
| fkmsdk | Multiplicative correction quantity. |
| fpvdk | Correction factor for adjusting the air mass flow at normal pressure upstream from the throttle valve to instantaneous conditions = pvdk/1013 hPa. |
| ftvdk | Intake-air temperature-compensation factor for converting the standard air mass flow to an air mass flow at an instantaneous temperature. |
| fupsrl | Conversion factor for the intake manifold pressure in a relative charge. |
| KLAF | Outflow characteristic for adjusting the standard flow measured at an above-critical rate of flow to below-critical rates of flow. |
| KUMSRL | Parameter for determining the relative cylinder charge from the air mass flow and the engine speed, piston-swept volume. |
| msdif | Difference between the calculated and measured gas mass flow = mshfm - msdk. |
| msdk | Calculated air mass flow over the throttle valve. |
| mshfm | Air mass flow measured by the hot-film air mass sensor. |
| msndk | Mass flow downstream from the throttle valve. |
| msndko | Additive correction quantity, leakage air over the throttle valve under normal conditions. |
| msndks | Setpoint for air mass flow under normal conditions. |
| MSNWDK | Standardized air mass flow over the throttle valve, measured in an air |
| (wdkba) | test bay. |
| msnwdks | Adjusted setpoint gas flow over the throttle valve. |
| mssol | Setpoint for the air mass flow under instantaneous conditions. |
| nmot | Engine speed. |
| pirg | Correction of the intake manifold pressure by exhaust gas recirculation, partial pressure of internal exhaust gas recirculation. |
| ps | Pressure in the intake manifold. |
| pssol | Setpoint pressure in the intake manifold. |
| pvdk | Pressure upstream from a throttle plate of the throttle valve = pvdkds × fkmsdk. |
| pvdkds | Ambient pressure measured by a pressure sensor. |
| rlroh | Air mass flowing into the intake manifold, uncorrected relative charge of a cylinder. |
| rl | Air mass flowing out of the intake manifold, corrected relative charge of a cylinder. |
| wdkba | Actual angle of a throttle plate of the throttle valve in relation to a stop. |
| wdks | Setpoint angle of a throttle plate of the throttle valve in relation to a stop = WDKMSN (msnwdk). |
| WDKMSN | Inverted characteristic of MSNWDK. |

What is claimed is:

1. A method for controlling a gas flow over a throttle valve into a combustion chamber of an internal combustion engine, comprising the steps of:

determining of an actual gas flow;

calculating the gas flow value over the throttle valve as a function of an actual throttle setting;

determining a difference between the calculated gas flow over the throttle valve and the actual gas flow;

calculating a throttle setpoint setting as a function of a setpoint gas flow and the determined difference;

activating the throttle valve using the throttle setpoint setting value;

determining at least two correction quantities;

determining the difference as a function of the at least two correction quantities; and storing at least one of the at least two correction quantities at an end of an internal combustion engine operation.

2. A method for controlling a gas flow over a throttle valve into a combustion chamber of an internal combustion engine, comprising the steps of:

determining of an actual gas flow;

calculating the gas flow value over the throttle valve as a function of an actual throttle setting;

determining a difference between the calculated gas flow over the throttle valve and the actual gas flow;

calculating a throttle setpoint setting as a function of a setpoint gas flow and the determined difference;

activating the throttle valve using the throttle setpoint setting value;

determining at least two correction quantities;

determining the difference as a function of the at least two correction quantities; and when an operation of the internal combustion engine resumes, utilizing a predetermined value as a starting value for at least one of the at least two correction quantities.

3. A motor vehicle, comprising:

an internal combustion engine including a combustion chamber and a throttle valve; and a device controlling a gas flow over the throttle valve in the combustion chamber, the device including a measuring sensor and a throttle valve controller, the measuring sensor determining an actual gas flow, the throttle valve controller including a computing arrangement, the computing arrangement calculating a gas flow over the throttle valve as a function of at least one throttle setting, the computing arrangement determining a difference between the calculated gas flow over the throttle valve and the actual gas flow, the throttle valve controller having an input signal for a setpoint gas flow and an output signal for a valve position of the at least one throttle setting, the computing arrangement calculating the output signal as a function of the determined difference.

4. A computer-readable data storage medium storing a set of instructions, the set of instructions capable of being executed by a processor to control a gas flow over a throttle valve into a combustion chamber of an internal combustion engine, the set of instructions performing the steps of:

determining of an actual gas flow;

calculating the gas flow over the throttle valve as a function of an actual throttle setting;

determining a difference between the calculated gas flow over the throttle valve and the actual gas flow;

calculating a throttle setpoint setting as a function of a setpoint gas flow and the determined difference; and activating the throttle valve using the throttle setpoint setting.

5. A computer-readable data storage medium storing parameters, the parameters for controlling a gas flow over a throttle valve into a combustion chamber of an internal combustion engine by performing the steps of:

determining an actual gas flow;

calculating the gas flow over the throttle valve as a function of an actual throttle setting;

determining a difference between the calculated gas flow over the throttle valve and the actual gas flow;

calculating a throttle setpoint setting as a function of a setpoint gas flow and the determined difference; and activating the throttle valve using the throttle setpoint setting.

6. A method for controlling a gas flow over a throttle valve into a combustion chamber of an internal combustion engine, comprising the steps of:

determining of an actual gas flow;

calculating the gas flow value over the throttle valve as a function of an actual throttle setting;

determining a difference between the calculated gas flow over the throttle valve and the actual gas flow;

calculating a throttle setpoint setting as a function of a setpoint gas flow and the determined difference;

activating the throttle valve using the throttle setpoint setting value;

determining at least two correction quantities;

determining the difference as a function of the at least two correction quantities; and determining the difference by adding at least one first correction quantity of the at least two correction quantities and multiplying at least one second correction quantity of the at least two correction quantities.

7. The method according to claim 6, wherein the at least one first correction quantity corrects a first error caused by leakage air over the throttle valve, and wherein the at least one second correction quantity corrects a second error which is caused by an incorrect detection of a pressure upstream from the throttle valve.

8. A device for controlling a gas flow over a throttle valve in a combustion chamber of an internal combustion engine, comprising:

a measuring sensor determining an actual gas flow; and a throttle valve controller including a computing device, the computing device calculating the gas flow over the throttle valve as a function of at least one throttle setting value, the computing arrangement determining a difference between the calculated gas flow over the throttle valve and the actual gas flow, the throttle valve controller having an input signal for a setpoint gas flow value and an output signal for a valve position value the computing arrangement calculating the output signal as a function of the determined difference.

9. The device according to claim 8, wherein, when the computing arrangement determines the difference, the computing arrangement also determines at least two correction quantities.

10. The device according to claim 8, wherein the computing arrangement calculates a throttle setpoint setting as a function of a setpoint gas flow and the difference, throttle valve being activated using the throttle setpoint setting.

11. A method for controlling a gas flow over a throttle valve into a combustion chamber of an internal combustion engine, comprising the steps of:

determining of an actual gas flow;

calculating the gas flow value over the throttle valve as a function of an actual throttle setting;

determining a difference between the calculated gas flow over the throttle valve and the actual gas flow;

calculating a throttle setpoint setting as a function of a setpoint gas flow and the determined difference; and activating the throttle valve using the throttle setpoint setting value.

12. The method according to claim 11, further comprising the step of:

determining at least two correction quantities; and determining the difference as a function of the at least two correction quantities.

13. The method according to claim 11, further comprising step of:

determining the setpoint gas flow as a function of at least one request for torque of the internal combustion engine.

* * * * *